United States Patent [19]

Khanna

[11] 4,209,593
[45] Jun. 24, 1980

[54] SEMI-FLEXIBLE SHOCK-ABSORBING POLYURETHANE FOAM PREPARED FROM A TRIOL, A COMPOUND HAVING A SINGLE REACTIVE HYDROGEN, AN AROMATIC POLYISOCYANATE, BLOWING AGENT, CHAIN-EXTENDER AND A CATALYST

[75] Inventor: Som N. Khanna, Guelph, Canada

[73] Assignee: Uniroyal Ltd., Ontario, Canada

[21] Appl. No.: 960,994

[22] Filed: Nov. 15, 1978

[30] Foreign Application Priority Data

Sep. 20, 1978 [CA] Canada ................................. 311684

[51] Int. Cl.$^2$ ............................................. C08G 18/14
[52] U.S. Cl. ....................................... 521/163; 521/176
[58] Field of Search .................. 521/163, 176; 528/49

[56] References Cited

U.S. PATENT DOCUMENTS

| | | | |
|---|---|---|---|
| 3,252,924 | 5/1966 | Merten et al. | 260/26 |
| 3,298,857 | 1/1967 | Terry | 428/425 |
| 3,630,819 | 12/1971 | Conger | 264/45 |
| 3,677,869 | 7/1972 | Chung et al. | 260/858 |
| 3,703,482 | 11/1972 | Coglianese et al. | 521/151 |
| 3,728,288 | 4/1973 | Cobbs et al. | 428/425 |
| 3,823,833 | 7/1974 | Chung | 213/40 R |
| 3,826,764 | 7/1974 | Weber | 106/15 R |
| 3,833,526 | 9/1974 | Cear | 252/182 |
| 3,836,487 | 9/1974 | Carter | 428/315 |

*Primary Examiner*—Maurice J. Welsh
*Attorney, Agent, or Firm*—James J. Long

[57] ABSTRACT

Energy absorbing polyurethane foam is made by reaction of an aromatic polyisocyanate with a polyether triol having dissolved therein a monofunctional bulky modifying ingredient, such as 2-naphthol.

19 Claims, No Drawings ions in use for these applications
SEMI-FLEXIBLE SHOCK-ABSORBING POLYURETHANE FOAM PREPARED FROM A TRIOL, A COMPOUND HAVING A SINGLE REACTIVE HYDROGEN, AN AROMATIC POLYISOCYANATE, BLOWING AGENT, CHAIN-EXTENDER AND A CATALYST This invention relates to a polyurethane foam and to a method of making same.

Semi-flexible urethane foams are being used extensively in automotive interior safety padding such as crash pads, sun visors, arm rests, door panels, pillars and steering wheel padding. Conventional semi-flexible urethane foams currently in use for these applications are supposed to perform two functions, viz: (i) load distribution and (ii) energy absorption. Experimental evidence shows that although these foams are good load distributors, they are deficient in their shock and energy-absorbing capabilities. Pendulum impact test data reveal that on impacting, these foams produce high rebound velocity due to their low hysteresis and yield high peak deceleration (G) and severity index, which are not conducive to their functions as good energy absorbers.

Attempts have been made to modify polyurethane foams used in safety cushions to obtain novel urethane foams having improved and more efficient energy-absorbing properties. For example, there has been developed a urethane-polystyrene composite foam which is composed of foamed in-situ polystyrene beads dispersed in a polyurethane foam matrix. It is reported that an improvement in energy absorption of these composite foams results from the crushing action of foamed polystyrene during an impact. This technique of obtaining polyurethane foams having improved energy-absorbing properties has a main drawback as the system is good for one shot use only. Once the polystyrene foam beads are crushed during an impact, the energy absorbing characteristics of the foam decrease sharply.

U.S. Pat. No. 3,703,482, Nov. 21, 1972, Coglianese, et al., discloses low density polyurethane foam having low thermal conductivity made with wood rosin as a modifier of the polyurethane. No mention is made of improved energy absorption and there is no disclosure of modifiers employed in the present invention as described hereinafter.

It has now been found in accordance with the present invention that the energy-absorbing characteristics of a semi-flexible polyurethane foam based on a polyol plus water or blowing agent, a crosslinker and/or a chain-extender and a polyisocyanate, can be substantially increased by the incorporation of certain bulky mono-functional, reactive hydrogen-containing compounds. In more detail, the invention provides an impact and energy-absorbing, semi-flexible, open-cell polyurethane foam capable of repeatedly absorbing shock without structural damage, comprising a reaction product of:

(a) a polyether triol having an hydroxyl number of from 25 to 115;
(b) a bulky modifying compound which is soluble in said triol (a) having a single reactive hydrogen site, selected from the group consisting of:
  (i) naphthalene substituted with a substituent selected from the group consisting of —OH, —COOH, —NH$_2$, and —SH;
  (ii) anthracene substituted with a substituent selected from the group consisting of —OH, —COOH, —NH$_2$, and —SH;
  (iii) phenanthrene substituted with a substituent selected from the group consisting of —OH, —COOH, —NH$_2$ and —SH;
  (iv) hydroabietyl alcohol; and
  (v) dehydroabietyl amine;
(c) an aromatic polyisocyanate reactive with (a) to form a polyurethane;
(d) at least one blowing agent selected from water and low boiling volatile organic liquid polyurethane blowing agents;
(e) at least one substance which is a polyurethane chain-extender or crosslinking agent having at least two reactive hydrogens; and
(f) a catalyst for polyurethane-forming reaction between the said triol (a) and the said polyisocyanate (c).

The modifying compounds (i) to (iii) as described above may if desired contain one or more additional noninterfering substituents not containing active hydrogen, such as alkyl, aralkyl, alkoxy, acetoxy, halogen, or the like. Equivalent to such substituted naphthalene, anthracene or phenanthrene are the hydrogenated forms thereof, that is, hydrogenated naphthalene, hydrogenated anthracene or hydrogenated phenanthrene containing a substituent having a single active hydrogen as described above. The modifying compound is preferably a substituted naphthalene and the substituent is preferably —OH (as in 1-naphthol or 2-naphthol).

As a consequence of having present, during the polyurethane forming reaction, a bulky monofunctional modifying ingredient as defined in (b) above, the impact and energy-absorbing properties of the polyurethane foam are unexpectedly greatly enhanced. The improvement in energy-absorbing characteristics of these foams is judged by a pendulum impact test, which produces data on hysteresis loss, rebound velocity, peak deceleration, severity index and energy-absorbing efficiency.

In practicing the invention there is first provided a physical mixture of the bulky monofunctional modifying ingredient (b) in the triol (a) without reaction between the modifying ingredient (b) and the triol (a). Thereafter the physical mixture of the triol (a) and the bulky monofunctional modifying ingredient (b) in the unreacted state is combined with (c) the aromatic polyisocyanate and the other ingredients to form the novel polyurethane foam of the invention capable of load distribution and having unexpectedly enhanced impact- and energy-absorbing characteristics compared to an otherwise similar foam from which the said modifying compound (b) is omitted. The pendulum impact test data on these modified urethane foams surprisingly reveal that the above-mentioned modifications produce urethane foams characterized by lower rebound velocity, peak deceleration (G) and severity index and higher energy-absorbing efficiency.

Various materials which may be used in carrying out the teachings of this invention are:

(a) Polyols: Polyols which are commercially available and used for the production of flexible and semi-flexible foams are well-known and described in the literature. For example, polyether polyols are produced by the addition of an alkylene oxide such as ethylene oxide, 1,2-propylene oxide, 1,2-butylene oxide and/or others to polyfunctional alcohols, amines or aminoalkanols. Polyols used to carry out this invention typically are triols having hydroxyl numbers in the range of about 25–115. An example of a suitable polyol is poly-(oxypropylene)-poly(oxyethylene) triol having a hydroxyl number of from 50 to 60.

(b) Modifiers: The bulky compounds having monofunctional reactive hydrogen sites such as 2-naphthol, hydroabietyl alcohol etc. which can be used as modifiers have been set forth above. However, short and long chain aliphatic compounds such as "isostearic acid" or butanol are not suitable. By way of non-limiting example, the following modifiers may be mentioned as typical:

1-naphthol, 2-naphthol, 1-naphthylamine, 2-naphthylamine, 1-amino-4-bromonaphthalene, 1-amino-5-bromonaphthalene, 2-amino-1-bromonaphthalene, 2-amino-3-bromonaphthalene, 2-amino-6-bromonaphthalene, 1-naphthoic acid, 2-naphthoic acid, 1-thionaphthol, 2-thionaphthol, 1-acetyl-2-naphthol, 2-acetyl-1-naphthol, 4-acetyl-1-naphthol, 3-acetyl-2-naphthol, 6-acetyl-2-naphthol, 3-acetyl-1-naphthol, 2-amino-1,6-dibromonaphthalene, 1-amino-2,4-dichloronaphthalene, 5-amino-1,4-dihydronaphthalene, 1-amino-2-methylnaphthalene, 1-amino-3-methylnaphthalene, 1-amino-4-methylnaphthalene, 2-amino-1-methylnaphthalene, 2-amino-6-methylnaphthalene, 1-benzyl-2-hydroxynaphthalene, 1-benzyl-4-hydroxynaphthalene, 2-benzyl-1-hydroxynaphthalene, 1-bromo-2-naphthol, 4-bromo-1-naphthol, 5-bromo-1-naphthol, 6-bromo-1-naphthol, 7-bromo-1-naphthol, 6-bromo-2-naphthol, 1-methyl-2-naphthol, 1-bromo-2-naphthoic acid, 2-chloro-1-naphthoic acid, 1,2-dihydro-2-naphthoic acid, 1,2-dihydro-1-naphthoic acid, 2-anthrol, 1-anthrol, 9-anthrol, 1-hydroxy-9,10-hydroanthracene, 2-hydroxy-9,10-dihydroanthracene, 1-anthroic acid, 2-anthroic acid, 9-anthroic acid, 1-aminoanthracene, 2-aminoanthracene, 9-aminoanthracene, 1-amino-2-benzoyl-anthracene, 2-amino-3-benzoylanthracene, 1-amino-2-bromoanthracene, 1-amino-3-bromoanthracene, 2-aminophenanthrene, 3-aminophenanthrene, 9-aminophenanthrene, 1-phenanthrol, 2-phenanthrol, 9-phenanthrol, 1-phenanthroic acid, 2-phenanthroic acid, 9-phenanthroic acid, and the like.

(c) Polyisocyanates: Any of the aromatic polyisocyanates conventionally used in making polyurethane, including toluene diisocyanate (TDI), 4,4'-diphenylmethane diisocyanate (MDI), their polymeric forms and prepolymers can be used to prepare the foams of this invention. An example of a suitable polyisocyanate is polymeric 4,4'-diphenylmethane diisocyanate (MDI) having an equivalent weight of 125–145 and an isocyanate functionality of 2.6–3.0. An example of a suitable prepolymer is a quasi-prepolymer prepared by reacting a small amount of a low molecular weight (e.g., molecular weight of from 90 to 500) polyol such as a diol (e.g., a chain extender as described below) with a large amount of a polyisocyanate to provide a product having 10–40 weight percent of free —NCO groups.

(d) Blowing Agents: Any conventional blowing agents for polyurethanes such as Freon 11B (trademark; trichlorofluoromethane), methylene chloride and water can be used.

(e) Chain-Extenders and Crosslinkers: Any conventional chain-extenders for polyurethanes may be used. Difunctional chain-extenders useful for carrying out this invention are usually either diols such as diethylene glycol, dipropylene glycol, 1,4-butanediol, or diamines such as 1,5-naphthylene diamine, 4,4'-methylene-bis(2-chloroaniline), etc. These chain-extenders increase the modulus of the foam without causing any change in the crosslink density.

Any conventional crosslinkers for polyurethanes may be used. Crosslinkers such as Quadrol [trademark; N,N,N', N'-tetrakis(2-hydroxypropyl)-ethylene diamine], glycerol trimethylolpropane, pentaerythritol, di- or trialkanolamines are typically used to increase the crosslink density which increases the compressive strength of the foam.

(f) Catalysts: Any conventional catalysts for polyurethanes can be used. Amine catalysts alone or in conjunction with a tin catalyst can be used to get a balanced rise and cure of the foam. Typical catalysts include, 1,4-diazabicyclo-2,2,2-octane (Dabco; trademark), triethylamine, N-ethylmorpholine, N,N,N',N'-tetramethylenediamine, N,N,N',N'-tetramethylbutanediamine (TMBDA) alkanolamines, dibutyl tin dilaurate, stannous octoate etc.

Other additives such as filler, pigments, surfactants and stabilizers can be incorporated as desired.

The quantities of the above material which can be used to prepare the foams of this invention are in accordance with conventional practice. In many cases preferred quantities are as follows:

| Ingredient | Parts by Weight |
|---|---|
| (a) Polyol | 100 |
| (b) Modifier | 5–45 |
| (c) Polyisocyanate | sufficient to provide an —NCO index of 1.0 to 1.05 |
| (d) Blowing agent e.g. water and/or volatile organic liquid | 0.1–3<br>5–20 |
| (e) Chain-extender and Crosslinker | 1–15<br>1–8 |
| (f) Catalyst | small, catalytic amount as required |
| (g) Pigments, fillers, etc. | as desired |

The objectives of the invention are to provide:

1. semi-flexible polyurethane foams having improved energy-absorbing characteristics,
2. semi-flexible polyurethane foams for use in safety cushioning for automobile interiors and exteriors,
3. urethane foams having low rebound velocity (high hysteresis),
4. urethane foams which produce low peak deceleration (G) on impact,
5. foams having low severity index,
6. foams having improved energy-absorbing efficiency.

The procedure followed to formulate, process and test polyurethane foams of this invention is typically as follows:

The required amount of a modifier (e.g., 2-naphthol) may be dissolved in a polyol heated to about 80°–85° C. with stirring. These modifiers give a clear solution which does not separate into two layers when cooled to room temperature. The required amounts of a chain-extender and/or a crosslinker, water (and/or volatile blowing agent), an isocyanate and catalysts are thoroughly mixed into the polyol solution of the modifiers (using a mechanical stirrer) and then poured into a 12 inch by 12 inch by 2 inch mold to form test slabs. Impact test data may be obtained by impacting these test slabs using a pendulum impact tester described as follows:

The pendulum impact tester consists of a 60 inch pendulum arm of steel tubing in which is mounted a 5.05 inch diameter, 40 pound steel, cylindrical head. The foam slabs (12"×12"×2") are mounted against a cemented abutment. An accelerometer is mounted on the back face of the cylindrical head and connected to an oscilloscope. This setup provides a direct deceleration vs. time curve on the oscilloscope screen which is photographed. In addition, a pin is mounted on the side of the impacting head and with the help of a stroboscopic lamp and a camera, reflected flashes of light from the protruding tip on the pin are photographed during an impact. This provides penetration vs. time data for the impact and rebound interval which is used to compute impact and rebound velocities, maximum penetration, deceleration vs. time, energy absorption, severity index and energy-absorbing efficiency. The energy absorption is defined as loss of energy due to hysteresis and is calculated by using equation (1):

$$\% \text{ Energy Absorption} = 1 - \frac{V_r^2}{V_i^2} \times 100 \quad (1)$$

wherein $V_i$ and $V_r$ are the impact and the rebound velocities respectively. The severity index is calculated using equation (2):

$$\text{Severity Index} = \Sigma G_1^{2.5} \times dt_i \quad (2)$$

wherein $G_i$ is the deceleration and $dt_i$ the time interval in seconds. The energy absorbing efficiency E, is defined as the ratio of the energy absorption per unit volume exhibited by a real material to that exhibited by an ideal material.

Typical polyurethane foams of the invention have a density of from 6 to 25 pounds per cubic foot. The present foams ordinarily exhibit a dynamic hysteresis loss of over 75%, a severity index of less than 1000 seconds, and a peak deceleration of less than 200 G when a 12 inch by 12 inch by 2 inch test specimen of the foam is impacted with the flat end of a cylindrical head having 5.05 inches diameter and 40 pounds weight travelling at a velocity of 22 feet per second. Typically the foam of the invention has a rebound of 12-20% when a one-pound steel ball is dropped from a height of 1.5 to 3 feet on a one inch thick sheet of the foam, and the foam is capable of recovering repeatedly from a deflection of 75%.

The modifiers of the invention are remarkable for their efficiency. Thus, for example, to obtain a particular energy absorption level, the amount (by weight) of 2-naphthol required would be only ½ that of rosin needed.

The following examples will serve to illustrate the practice of the invention in more detail.

EXAMPLE 1

Foam slabs 12 inch by 12 inch by 2 inch are molded using the following formulation:

| Ingredient | Parts by Weight |
|---|---|
| (a) Polyether triol | 100.0 |
| (b) 2-Naphthol | 17.7 |

-continued

| Ingredient | Parts by Weight |
|---|---|
| (c) Polymeric MDI | 79.4 |
| (d) Water | 2.65 |
| (e) Propoxylated ethylene diamine | 2.82 |
| (f) Stannous octoate | 0.002 |
| (f) Triethylamine | 0.176 |

The 2-naphthol is stirred into the polyether triol heated to 80°–85°. The polyether triol is a poly(oxypropylene)-poly(oxyethylene) triol of about 3000 molecular weight (hydroxyl number 56) prepared by the polymerization of 1,2-propylene oxide using glycerol as an initiator and then at least 50% end-capped with ethylene oxide to get at least 50% primary hydroxyl groups to increase the reactivity towards isocyanate (Voranol CP 3001 [trademark]). A clear solution is obtained which does not separate into two layers when cooled to room temperature. To this solution are added the propoxylated ethylene diamine (equivalent weight 73; Quadrol [trademark]), the water, and the polymeric MDI (equivalent weight about 135, isocyanate functionality about 2.8; Rubinate M [trademark]) in amounts shown which give an isocyanate index of 1.05, the stannous octoate($T_9$ [trademark]), and the triethylamine. The mixture is thoroughly blended using a mechanical stirrer and poured into a mold which has previously been coated with mold release. The sample is demolded after about 15 minutes and allowed to post-cure at room temperature for at least 24 hours before testing. The following results are obtained when the slab is impacted at room temperature at a velocity of 20 feet per second using the pendulum impact tester described above:

| | |
|---|---|
| Energy absorption (%) | 89.3 |
| Peak deceleration (G) | 149 |
| Severity index | 740 |
| Energy absorbing efficiency (%) | 36 |

In comparison, an unmodified foam (containing no 2-naphthol) has an energy absorption of 66.4%, a peak deceleration of 540 G, a severity index of 2763 and an energy-absorbing efficiency of 11.2%, thus showing the substantially enhanced energy-absorbing characteristics attained by the incorporation of the 2-naphthol modifier in accordance with the invention.

EXAMPLE 2

Polyurethane foams are prepared by the procedure of Example 1 using the formulation:

| Ingredient | Weight |
|---|---|
| (a) Voranol CP3001 | 100.0 |
| (b) Hydroabietyl alcohol | 50.0 |
| (c) Rubinate M | 111.0 |
| (d) Water | 4.05 |
| (e) Quadrol | 4.5 |
| (f) $T_9$ | 0.6 |
| (f) Triethylamine | 0.4 |

The hydroabietyl alcohol is a technical grade available under the trademark Abitol. Pendulum impact test data obtained at room temperature at 20 ft./sec. impact velocity are:

| | |
|---|---|
| Energy Absorption (%) | 87.3 |
| Peak Deceleration (G) | 144 |
| Severity Index | 730 |
| Energy Absorbing Efficiency (%) | 35.5 |

EXAMPLE 3

Polyurethane foams are prepared by the procedure of Example 1 using the following:

| Ingredient | Weight |
|---|---|
| (a) Voranol CP3001 | 100.0 |
| (b) 2-Naphthol | 17.7 |
| (c) Rubinate M | 115.0 |
| (d) Water | 2.7 |
| (e) Diethylene glycol (DEG) | 15.0 |
| (f) 25% Dabco in DEG | 1.2 |

Pendulum impact test data obtained at room temperature at 20 ft./sec. impact velocity are:

| | |
|---|---|
| Energy Absorption (%) | 85 |
| Peak Deceleration (G) | 122 |
| Severity Index | 750 |
| Energy Absorbing Efficiency (%) | 35 |

What is claimed is:

1. An impact-absorbing and energy-absorbing, semi-flexible, open-cell polyurethane foam capable of repeatedly absorbing shock without structural damage, comprising a reaction product of:
   (a) a polyether triol having an hydroxyl number of from 25 to 115;
   (b) a modifying compound which is soluble in said triol (a) having a single reactive hydrogen site, selected from the group consisting of:
      (i) naphthalene substituted with a substituent selected from the group consisting of —OH, —COOH, —NH$_2$, and —SH;
      (ii) anthracene substituted with a substituent selected from the group consisting of —OH, —COOH, —NH$_2$, and —SH;
      (iii) phenanthrene substituted with a substituent selected from the group consisting of —OH, —COOH, —NH$_2$ and —SH;
      (iv) hydroabietyl alcohol; and
      (v) dehydroabietyl amine;
   (c) an aromatic polyisocyanate reactive with (a) to form a polyurethane;
   (d) at least one blowing agent selected from water and low boiling volatile organic liquid polyurethane blowing agents;
   (e) at least one substance which is a polyurethane chain-extender or crosslinking agent having at least two reactive hydrogens; and
   (f) a catalyst for polyurethane-forming reaction between the said triol (a) and the said polyisocyanate (c).

2. A polyurethane foam as in claim 1 in which the said (b) is (i).

3. A polyurethane foam as in claim 2 in which the substituent is —OH.

4. A polyurethane foam as in claim 1 in which the said (b) is 2-naphthol or hydroabietyl alcohol.

5. A polyurethane foam as in claim 1 having the following properties:
   (a) a density of from 6 to 25 pounds per cubic foot;
   (b) a dynamic hysteresis loss of over 75%, a severity index of less than 1,000 seconds, and a peak deceleration of less than 200 G when a 12 inch by 12 inch by 2 inch test specimen of the foam is impacted with the flat end of a cylindrical head having 5.05 inches diameter and 40 pounds weight traveling at a velocity of 22 feet per second;
   (c) a rebound of 12-20% when a one pound steel ball is dropped from a height of 1.5 to 3 feet on a one inch thick sheet of the foam; and
   (d) the foam is capable of recovering repeatedly from a deflection of 75%.

6. A polyurethane foam as in claim 5 in which (a) is a poly(oxypropylene)-poly(oxyethylene) triol having a hydroxyl number of from 50 to 60.

7. A polyurethane foam as in claim 5 in which (b) is 2-naphthol.

8. A polyurethane foam as in claim 5 in which (c) is polymeric 4,4'-diphenylmethane diisocyanate having an equivalent weight of 125-245 and an isocyanate functionality of 2.6-3.0.

9. A polyurethane foam as in claim 5 in which:
   (a) is a poly(oxypropylene)-poly(oxyethylene) triol having an hydroxyl number of from 50 to 60;
   (b) is 2-naphthol or hydroabietyl alcohol;
   (c) is polymeric 4,4'-diphenylmethane diisocyanate having an equivalent weight of 125-145 and an isocyanate functionality of 2.6-3.0.

10. A method of making an impact-absorbing and energy-absorbing, semi-flexible, open-cell polyurethane foam capable of repeatedly absorbing shock without structural damage comprising providing a physical mixture of:
   (a) a polyether triol having an hydroxyl number of from 25 to 115 with,
   (b) a modifying compound which is soluble in said triol (a), without reacting with said triol (a), having a single reactive hydrogen site, selected from the group consisting of:
      (i) naphthalene substituted with a substituent selected from the group consisting of —OH, —COOH, —NH$_2$, and —SH;
      (ii) anthracene substituted with a substituent selected from the group consisting of —OH, —COOH, —NH$_2$, and —SH;
      (iii) phenanthrene substituted with a substituent selected from the group consisting of —OH, —COOH, —NH$_2$ and —SH;
      (iv) hydroabietyl alcohol; and
      (v) dehydroabietyl amine; thereafter combining said physical mixture of (a) and (b) in the unreacted state with:
   (c) an aromatic polyisocyanate;
   (d) at least one blowing agent selected from water and low boiling volatile organic liquid polyurethane blowing agent;
   (e) at least one substance which is a polyurethane chain-extender or crosslinking agent having at least two reactive hydrogens; and
   (f) a catalyst for polyurethane-forming reaction between the said triol (a) and the said polyisocyanate (c);
   whereby there is formed a polyurethane foam capable of load distribution and having enhanced impact- and energy-absorbing characteristics compared to an otherwise similar foam from which the said modifying compound (b) is omitted.

11. A method as in claim 10 in which the said (b) is (i).

12. A method as in claim 11 in which the substituent is —OH.

13. A method as in claim 10 in which the said (b) is 2-naphthol or hydroabietyl alcohol.

14. A method as in claim 10 in which the polyurethane foam has the following properties:
(a) a density of from 6 to 25 pounds per cubic foot;
(b) a dynamic hysteresis loss of over 75%, a severity index of less than 1000 seconds, and a peak deceleration of less than 200 G when a 12 inch by 12 inch by 2 inch test specimen of the foam is impacted with the flat end of a cylindrical head having 5.05 inches diameter and 40 pounds weight traveling at a velocity of 22 feet per second;
(c) a rebound of 12-20% when a one pound steel ball is dropped from a height of 1.5 to 3 feet on a one inch thick sheet of the foam; and
(d) the foam is capable of recovering repeatedly from a deflection of 75%.

15. A method as in claim 14 in which (a) is a poly(oxypropylene)-poly(oxyethylene) triol having a hydroxyl number of from 50 to 60.

16. A method as in claim 14 in which (b) is 2-naphthol.

17. A method as in claim 14 in which (c) is polymeric 4,4'-diphenylmethane diisocyanate having an equivalent weight of 125-145 and an isocyanate functionality of 2.6-3.0.

18. A method as in claim 14 in which:
(a) is a poly(oxypropylene)-poly(oxyethylene) triol having an hydroxyl number of from 50 to 60;
(b) is 2-naphthol or hydroabietyl alcohol;
(c) is polymeric 4,4'-diphenylmethane diisocyanate having an equivalent weight of 125-145 and an isocyanate functionality of 2.6-3.0.

19. The product of the method of claim 10.

* * * * *